(12) United States Patent
Mitchell

(10) Patent No.: US 9,286,911 B2
(45) Date of Patent: *Mar. 15, 2016

(54) SOUND IDENTIFICATION SYSTEMS

(71) Applicant: AUDIO ANALYTIC LTD., Cambridge (GB)

(72) Inventor: Christopher James Mitchell, Cambridge (GB)

(73) Assignee: Audio Analytic LTD (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/533,837

(22) Filed: Nov. 5, 2014

(65) Prior Publication Data

US 2015/0106095 A1  Apr. 16, 2015

Related U.S. Application Data

(63) Continuation of application No. 13/128,588, filed as application No. PCT/GB2009/051606 on Nov. 26, 2009, now Pat. No. 8,918,343.

(30) Foreign Application Priority Data

Dec. 15, 2008 (GB) .................................. 0822776.1

(51) Int. Cl.
*G06F 15/18* (2006.01)
*G10L 25/51* (2013.01)
(Continued)

(52) U.S. Cl.
CPC ................. *G10L 25/51* (2013.01); *G06F 17/18* (2013.01); *G08B 13/00* (2013.01); *G10L 15/02* (2013.01); *G10L 15/142* (2013.01); *G10L 15/20* (2013.01); *G10L 25/57* (2013.01); *G10L 25/63* (2013.01)

(58) Field of Classification Search
None
See application file for complete search history.

(56) References Cited

U.S. PATENT DOCUMENTS 5,276,629 A   1/1994  Reynolds
6,253,174 B1 * 6/2001  Ishii et al. ................... 704/231
(Continued)

FOREIGN PATENT DOCUMENTS

WO     WO 99/56214      11/1999
WO     WO 2006/075352 A  7/2006
(Continued)

OTHER PUBLICATIONS

Wang, et al. :"Voice Source Localization for Automatic Camera Pointing System in Videoconferencing"; 1997, IEEE, p. 187-190.*
(Continued)

*Primary Examiner* — Jeffrey A Gaffin
*Assistant Examiner* — Paulinho E Smith
(74) *Attorney, Agent, or Firm* — Tarolli, Sundheim, Covell & Tummino, LLP

(57) ABSTRACT

A digital sound identification system for storing a Markov model is disclosed. A processor is coupled to a sound data input, working memory, and a stored program memory for executing processor control code to input sound data for a sound to be identified. The sample sound data defines a sample frequency domain data energy in a range of frequency. Mean and variance values for a Markov model of the sample sound are generated. The Markov model is stored in the non-volatile memory. Interference sound data defining interference frequency domain data is inputted. The mean and variance values of the Markov model using the interference frequency domain data are adjusted. Sound data defining other sound frequency domain data are inputted. A probability of the other sound frequency domain data fitting the Markov model is determined. Finally, sound identification data dependent on the probability is outputted.

10 Claims, 13 Drawing Sheets

(51) Int. Cl.
*G10L 15/02* (2006.01)
*G06F 17/18* (2006.01)
*G10L 15/14* (2006.01)
*G10L 25/63* (2013.01)
*G10L 25/57* (2013.01)
*G08B 13/00* (2006.01)
*G10L 15/20* (2006.01)

(56) References Cited

U.S. PATENT DOCUMENTS

| | | | |
|---|---|---|---|
| 6,826,528 B1* | 11/2004 | Wu et al. | 704/226 |
| 6,862,359 B2* | 3/2005 | Nordqvist et al. | 381/312 |
| 7,509,259 B2* | 3/2009 | Song | 704/256.2 |
| 8,787,866 B2* | 7/2014 | Battaglini et al. | 455/404.1 |
| 2001/0044719 A1* | 11/2001 | Casey | 704/245 |
| 2002/0135485 A1* | 9/2002 | Arakawa | 340/573.1 |
| 2003/0088411 A1* | 5/2003 | Ma et al. | 704/236 |
| 2006/0227237 A1 | 10/2006 | Kienzle et al. | |
| 2008/0001780 A1* | 1/2008 | Ohno et al. | 340/904 |
| 2008/0240458 A1* | 10/2008 | Goldstein et al. | 381/72 |
| 2009/0228422 A1* | 9/2009 | Yen et al. | 706/52 |
| 2011/0218952 A1* | 9/2011 | Mitchell | 706/12 |
| 2015/0066497 A1* | 3/2015 | Sun et al. | 704/233 |
| 2015/0066498 A1* | 3/2015 | Ma et al. | 704/233 |
| 2015/0106095 A1* | 4/2015 | Mitchell | 704/236 |

FOREIGN PATENT DOCUMENTS

WO   WO 2008/016360 A1   2/2008
WO   WO 2008/139203 A2   11/2008

OTHER PUBLICATIONS

Sarikaya et al., "Robust Speech Activity Detection in the Presence of Noise", Oct. 1998, IEEE, pp. 1-4.*
Christopher Mitchell, "Aligning Music Genre Taxonomies", Jan. 2007, pp. 1-225.*
Goldmann et al.: *"Extracting High Level Semantics by Means of Speech, Audio, and Image Primitives in Surveillance Applications"*; Communication Systems Group, Technical University of Berlin, Einsteinufer 17, 10587 Berlin; 2006 IEEE International Conference, Oct. 8-11, 2006, ISSN: 1522-4880, p. 2397-2400.
Gonzalez: *"Enhancing Video Surveillance with Audio Events"*; Institute for Intelligent Integrated Systems, Griffith University, PMB 50, Gold Coast Mail Centre, QLD, 4217; http://www.scieweavers.org/publications/enhancing-video-surveillance-audio-events; Dec. 3-5, 2007, pp. 61-66.
International Search Report for PCT/GB2009/051606, completed Dec. 22, 2009 by Elko Zimmermann of the EPO.
Mitchell: *"Aligning Music Genre Taxonomies"*; PhD Thesis, Anglia Ruskin University, 2007; pp. 1-225.
Mizobuchi et al.: *"Camera Control System Using Speech Recognition Technology"*; World Conference on Educational Multimedia, Hypermedia and Telecommunications; Jan. 30, 2008, XP002561489, Retrieved from the internet: URL:http://www.editlib.org/p/28649.
Nouza: *"Feature Selection Methods for Hidden Markov Model-Based Speech Recognition"*; 1996, IEEE, p. 186-190.
Sarikaya et al.: *"Robust Speech Activity Detection in the Presence of Noise"*; 19981001, Oct. 1, 1998, p. P922, CP007000673.
Schmandt et al.: *"Listenin' to Domestic Environments from Remote Locations"*; International Conference on Auditory Display, Boston, MA, USA, Jul. 6, 2003-Jul. 9, 2003, XP002561488, Retrieved from the internet: URL:http://www.icad.org.proceedings/2003/SchmandtVallejo2003.pdf.
Tzanetakis et al.: *"Sound Analysis Using MPEG Compressed Audio"*; Acoustics, Speech and Signal Processing, 2000. ICASSP '00. Proceedings S. 2000 IEEE International Conference on Jun. 5-9, 2000, Piscataway, NJ, USA, IEEE, vol. 2, Jun. 5, 2000, pp. 761-764, XP010504834, ISBN: 978-0-7803-6293-2.
Wang, et al.: *"Voice Source Localization for Automatic Camera Pointing System in Videoconferencing"*; 1997, IEEE, p. 187-190.

* cited by examiner

SOUND IDENTIFICATION SYSTEMS

RELATED APPLICATIONS

This application is a continuation of U.S. patent application Ser. No. 13/128,588, filed 10 May 2011, which is incorporated herein in its entirety.

FIELD OF THE INVENTION

This invention relates to systems, methods and computer program code for identifying sounds, and to related applications of such techniques.

BACKGROUND TO THE INVENTION

Basic sound identification systems are known but there is a need for improved techniques. Background prior art can be found in: US2006/227237; WO99/56214; WO2008/016360; U.S. Pat. No. 5,276,629; Goldmann, R (2006), "Extracting High level semantics by means of speech audio and image primitives in surveillance"; Gonzalez, L (2006), "Enhancing video surveillance with audio events"; and Mitchell, C. J (2007), "Aligning Music Genre Taxonomies", PhD Thesis, Anglia Ruskin University.

For further use merely in understanding the present invention, the following disclosures are referred to:
  International patent application PCT/GB2008/001679, Data Processing Apparatus, published 20 Nov. 2008, Ipsotek Ltd.;
  WO2006/075352 A, Valentino Franco et al., Surveillance method and surveillance device operating with said method, published 20 Jul. 2006;
  US patent application US2006/22737 A, IBM;
  International patent application WO2008/016360 A, IBM;
  US patent application US2003/088411 A1, Motorola Inc.; and
  US patent application US2002/135485, Arakawi Kaoru.

SUMMARY OF THE INVENTION

According to a first aspect of the invention there is therefore provided a digital sound identification system, the system comprising: non-volatile memory for storing a Markov model; stored program memory storing processor control code; a sound data input; a processor coupled to said sound data input, to said working memory, and to said stored program memory for executing said processor control code, and wherein said processor control code comprises code to: input, from said sound data input, first sample sound data for a first sound to be identified, said first sample sound data defining first sample frequency domain data, said first sample frequency domain data defining an energy of said first sample in a plurality of frequency ranges; generate a first set of mean and variance values for at least a first Markov model of said first sample sound from said first sample frequency domain data; store said first Markov model in said non-volatile memory; input interference sound data defining interference frequency domain data; adjust said mean and variance values of said first Markov model using said interference frequency domain data; input third sound data defining third sound frequency domain data; determine a probability of said third sound frequency domain data fitting at least said first Markov model; and output sound identification data dependent on said probability.

The mean and variance data for the Markov model is generated from frequency domain data. In some embodiments the system inputs sound data in the time domain, for example, from an analogue-to-digital converter, and then converts this to the frequency domain. Additionally or alternatively however the system may operate on compressed sound data, for example MP3 data which is already encoded into frequency domain information. This may involve sub-band scanning as described in relation to further aspect below.

Where a time-to-frequency conversion is performed, in embodiments this may employ a series of time-to-frequency conversions, for example fast fourier transforms, operating on successive, preferably overlapping time frames or windows, for example, 20 milliseconds windows with a 10 millisecond overlap. These perform a transform into a plurality of frequency ranges or bands, for example, quarter octave sub-band decomposition over a range which depends upon the sound(s) to be identified, for example, over a range of approximately 1-10 KHz. Optionally, following the time-frequency transformation a normalisation step may be performed to reduce effective changes in amplitude of the input signal. In embodiments an optional statistical decomposition may also be applied prior to generating the mean and variance values for the Markov model, in particular to simplify the modelled features. This statistical decomposition may comprise, for example, a principal component analysis (PCA) or independent component analysis (ICA). This is particularly helpful where poor quality microphones are being employed and/or complex sounds are being identified.

In embodiments the Markov model comprises a continuous hidden Markov model described by a plurality of states and transitions, with associated probabilities for the transitions between the states. This representation is resilient to changes in audio sampling rate, the use of compression, and input of relatively poor quality sound data. In embodiments of the system the second sample sound data, defining second sample frequency domain data, may be employed to generate a second set of mean and variance values for a second Markov model, and interference sound data (which may be different to the interference sound data for the first Markov model) may be employed to update this second model. In this way a plurality of different Markov models may be defined each corresponding to a sound to be identified, and then the input (third) sound data may, effectively, be fitted to each of the stored Markov models to identify the most closely matching model. In embodiments the mean and covariance values may be expressed and processed in the form of a covariance matrix.

The interference sound data may comprise, for example, typical background sound to the sound to be identified; this will in general depend upon the sound to be identified. For example, in an application to identify when a person is becoming aggressive, for example in a hospital accident and emergency facility, typical background noise of such a facility may be employed as the interference sound data. Alternatively, in an application to detect when a car window has been smashed in a car park (when the sound to be identified may comprise the sound of the breaking window and/or a car alarm) the interference sound data may comprise, for example, car engine or traffic noise. In general the interference sound data may comprise either or both of general background noise for the sound to be identified and one or more specific expected interfering sounds, for example, in an outdoor location an emergency vehicle siren. In a straightforward implementation the mean and variance values determined from the interference sound sample, more particularly from frequency domain data for the interference sound sample, may simply be subtracted from the mean and variance values from the first or each sample sound.

In embodiments of the system a state of the Markov model is defined by a set of frequency ranges or bands comprising the frequency ranges or bands defined by the frequency domain data. Each state may be represented by one or more (gaussian) distributions, each distribution being characterised by a mean and a variance value. The system may include a user interface to enable a user, for example at system setup, to define one or both of a number of states of the model, and a number of gaussian distributions employed per state.

Broadly speaking an input sample sound is processed by decomposition into frequency bands, and optionally de-correlated, for example, using PCA/ICA, and then this data is compared to each Markov model to generate log likelihood ratio (LLR) data for the input sound to be identified. A (hard) confidence threshold may then be employed to determine whether or not a sound has been identified; if a "fit" is detected to two or more stored Markov models then preferably the system picks the most probable. As the skilled person will understand a sound is "fitted" to a model by effectively comparing the sound to be identified with expected frequency domain data predicted by the Markov model. False positives are reduced by correcting/updating means and variances in the model based on interference (which includes background) noise.

Therefore according to a related aspect the invention provides a method of identifying a sound, the method comprising: configuring a Markov model using a sample of the sound; inputting a sample of background or interfering sound for a said sound to be identified; adjusting said Markov model to reduce false positive identification by using said sample of background or interfering sound to adjust mean and variance parameters characterising probability distributions associated with states of said Markov model; and using said adjusted Markov model to identify a said sound by comparing a sound to be identified with said adjusted model to determine a probability of said sound to be identified fitting said model by comparing said sound to be identified with expected frequency domain data predicted by said Markov model.

The invention also provides a method of producing a Markov model of a sound to be identified, comprising: configuring a Markov model using a sample of the sound; inputting a sample of background or interfering sound for a said sound to be identified; and adjusting said Markov model to reduce false positive identification by using said sample of background or interfering sound to adjust mean and variance parameters characterising probability distributions associated with states of said Markov model.

The invention in a complementary aspect provides a system for identifying a sound, the system comprising: means for configuring a Markov model using a sample of the sound; means for inputting a sample of background or interfering sound for a said sound to be identified; means for adjusting said Markov model to reduce false positive identification by using said sample of background or interfering sound to adjust mean and variance parameters characterising probability distributions associated with states of said Markov model; and means for using said adjusted Markov model to identify a said sound by comparing a sound to be identified with said adjusted model to determine a probability of said sound to be identified fitting said model by comparing said sound to be identified with expected frequency domain data predicted by said Markov model.

The invention further provides a sound amplification or transmission system, the system comprising: a sound input to input a sound; a sound identification system to identify whether said sound fits a model; and an amplifier or transmitter to selectively amply or transmit said sound responsive to said identification.

Preferably the model comprises a Markov model generated as described above, although depending on the application correction for interfering noise may not be needed.

One preferred application is in a baby monitor or alarm in which the volume of the baby monitor is adjusted when specific sounds are identified, especially relatively quiet sounds as compared with the baby crying. Such sounds may include, for example, cessation of breathing and/or choking (and thus the "sound" to be identified may, in embodiments, be an absence of an expected sound). In implementations of such a system a delay is included between the sound input and the amplified and/or transmitted sound, albeit only a relatively short delay, to enable a sound to be identified and hence the volume or amplitude of the identified sound to be adjusted.

In another application a Markov model, in particular, as described above, is employed in a security system including a least one camera, to enable the camera to be controlled or moved responsive to identification of a particular type of sound, for example, breaking glass, a car alarm, or a gunshot. Thus in a further aspect there is provided a security camera system having at least one controllable camera, at least one microphone to capture sound, and including a sound identification system to identify whether said sound fits a Markov model, the system further comprising a camera controller to move said camera responsive to identification of a sound with a greater than a threshold probability of fitting said Markov model.

In an embodiment of such a security camera system, or any other embodiment of the aspects described herein using at least one camera, detection of specific sounds may result in several practical triggers into a system such as an existing CCTV system. These may include any one or more of the following:

- automated moving or zooming of cameras to make the source of the sound more evident to operators, e.g., CCTV security operators, for example a car alarm happening out of a camera's field of view and the camera being moved so the operator can monitor the situation;
- triggering audible or visual alerts to security personal which could include showing in text on a monitor the sound the system has detected or an audible alarm;
- automatic playback of recorded audio and/or video within which the sound was detected in, e.g., automatically play a predetermined duration, e.g., 10 seconds, of audio and/or video comprising a recording of someone being aggressive in the middle;
- pre and post recording of audio around the sound for use by security personal as evidence;
- use in combination with video analytic alerts such as a panic detection (lots of people running and lots of screaming is equivalent to panic); and
- playing back audible or visual warnings near the location the sound was detected.

In some preferred embodiments the microphone employed is incorporated within one or more cameras of the system. Such microphones are generally of poor quality but in embodiments the improved sound identification techniques we employ enables poor quality input data to be employed whilst nonetheless accurately identifying one or more sounds. In response a camera can be, for example, caused to perform a pan movement or swiveled towards the audio (in the latter case it is preferable to employ two or more cameras/microphones to triangulate the source of the identified noise).

In a further related aspect there is provided a phone network having a plurality of phones coupled to an exchange or network controller, each of said phones having a microphone to listen to a local sound, the phone network including a sound identification system to identify whether said sound fits a model, the system further comprising a controller to enable and disable said microphones of said phones as input to said sound identification system for monitoring sounds in locations of said phones.

Broadly speaking in embodiments a set of phones connected to a PBX (private branch exchange) may be employed as a distributed break-in/intruder detection system by controlling the phones to enable their respective microphones to detect sound when a building is unoccupied. A sound identification system, in particular, as described above, may then be employed to identify sounds characteristic of an intruder, and to provide an alarm or alert either locally or remotely.

In a further aspect there is provide an aid for providing in-home assistance, the aid having a microphone to capture sound, and a sound identification system to identify whether said sound fits a model, and a controller coupled to said sound identification system to identify a sound designating a request for aid and to instigate a communication to a helper in response to said identification.

An aid as described above has particular applications in a system of the type employing a central in-house controller with a communication link, typically via a phone line, to enable a user, typically an elderly person, carrying a mobile unit with an alert button, to call for help from a friend, neighbour, relative or health care worker by pressing the button. Typically the mobile unit is provided on a lanyard, and may often be taken off. A sound identification system, in particular of the type described above, may be incorporated into the base unit to detect one or more trigger words or sounds, for example, claps or a cry for help, and then to alert a helper. In this way the base unit may provide backup in the event that the mobile unit has been removed or accidentally forgotten.

The skilled person will recognise that in embodiments of the above described sound identification system one or more Markov models may be generated and corrected for background noise/interference prior to being used in a target application. Thus the target application system need not include code to set up and configure the system.

Thus in a further aspect the invention provides a digital sound identification system, the system comprising: non-volatile memory for storing a Markov model; stored program memory storing processor control code; a sound data input; a processor coupled to said-sound data input, to said working memory, and to said stored program memory for executing said processor control code and wherein said processor control code comprises code to: input sound data defining sound frequency domain data; determine a probability of said sound frequency domain data fitting at least said first Markov model; and output sound identification data dependent on said probability.

The skilled person will also recognise that in some applications correction of the Markov model for interference may not be required.

Thus the invention still further provides a digital sound identification system, the system comprising: non-volatile memory for storing a Markov model; stored program memory storing processor control code; a sound data input; a processor coupled to said-sound data input, to said working memory, and to said stored program memory for executing said processor control code and wherein said processor control code comprises code to: input first sample sound data for a first sound to be identified from said sound data input, said first sample sound data defining first sample frequency domain data, said first sample frequency domain data defining an energy of said first sample in a plurality of frequency ranges; generate a first set of mean and variance values for at least a first Markov model of said first sample sound from said first sample frequency domain data; store said first Markov model in said non-volatile memory; input third sound data defining third sound frequency domain data; determine a probability of said third sound frequency domain data fitting at least said first Markov model; and output sound identification data dependent on said probability; wherein said sound data comprises compressed sound data representing a sound in said frequency domain.

The invention also provides processor control code to implement the above-described systems and methods, in particular on a data carrier such as a disk, CD- or DVD-ROM, programmed memory such as read-only memory (Firmware). Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

The invention further provides a data carrier storing one or more Markov models with means and variances generated and updated to compensate for background/interference as described above.

Aspects and embodiments of the system, methods and code we describe may be used for non-audible sound signals, in particular infrasound and ultrasound, and references to sound in this specification are not limited to audible sound.

According to a still further aspect of the invention there is provide a digital sound identification system comprising: non-volatile memory (alternatively referred to as working memory throughout this specification regarding aspects and embodiments) for storing a sound model (e.g., a Markov model); stored program memory storing processor control code; a sound data input; a processor coupled to said sound data input, to said non-volatile memory, and to said stored program memory for executing said processor control code, and wherein said processor control code comprises code to: input a compressed audio data stream, said compressed audio data stream comprising a sequence of blocks of compressed audio data, said block comprising a set of coefficients for an audio frame, said coefficients defining audio energies in a plurality of frequency bands of said audio frame; process said coefficients to recognise one or more patterns in said coefficients to identify a sound; and output sound identification data responsive to said pattern recognition processing.

There are several practical considerations when trying to detect sounds from compressed audio formats in a robust and scalable manner. In any embodiment wherein the sound stream may be uncompressed to PCM (pulse code modulated) format and then passed to a classification system, the first stage of an audio analysis system may be to perform a frequency analysis on the incoming uncompressed PCM audio data. However, the recently compressed form of the audio may contain a detailed frequency description of the audio, for example where the audio is stored as part of a lossy compression system. By directly utilising this frequency information in the compressed form, i.e., sub-band scanning in an embodiment of the above still further aspect, a considerable computational saving may be achieved by not uncompressing and then frequency analysing the audio. This may mean a sound can be detected with a significantly lower computational requirement. Further advantageously, this may make the application of a sound detection system more scalable and enable it to operate on devices with limited computational power which other techniques could not operate on.

There may further be provided the digital sound identification system wherein said coefficients comprise discrete cosine transform (DCT) or modified DCT coefficients.

There may further be provided the digital sound identification system wherein said compressed audio data stream is an MPEG standard data stream, in particular an MPEG 4 standard data stream.

There may further be provided the digital sound identification system wherein said pattern recognition processing comprises processing using a Markov model adapted to a said sound to be identified.

In embodiments of this aspect of the invention processing of the compressed audio data stream facilitates rapid sound identification and scalability to (parallel) processing of a plurality of data streams. In some preferred embodiments the compressed audio data stream is an MPEG standard data stream, for example an MPEG 1 layer 3 audio stream or an MPEG 2 AAC (advanced audio codec) layer data stream. In preferred embodiments the data stream is in an MPEG 4 wrapper. Thus, as the skilled person will appreciate, the data stream may comprise interleaved blocks of video and audio data, the audio data blocks being processed as described above. In embodiments an audio data block provides data for a frame of audio, for example a 20 microsecond frame, and comprises a data summary part defining energies for each of a relatively broad set of frequency bands, followed by a set of DCT (discrete cosine transform) coefficients, in particular MDCT (modified DCT) coefficients. In some preferred embodiments the pattern recognition processing is performed on the (M) DCT coefficients. The skilled person will appreciate, however, that alternative forms of compressed audio data may be employed, for example wavelet-based compression (using wavelets as basis functions). In preferred embodiments of the technique the compression employed is lossy rather than lossless. As previously described, preferred embodiments of the pattern recognition processing employ a Markov model adapted to the sound to be identified.

BRIEF DESCRIPTION OF THE DRAWINGS

These and other aspects of the invention will now be further described, by way of example only, with reference to the accompanying figures in which.

Figure 1A:
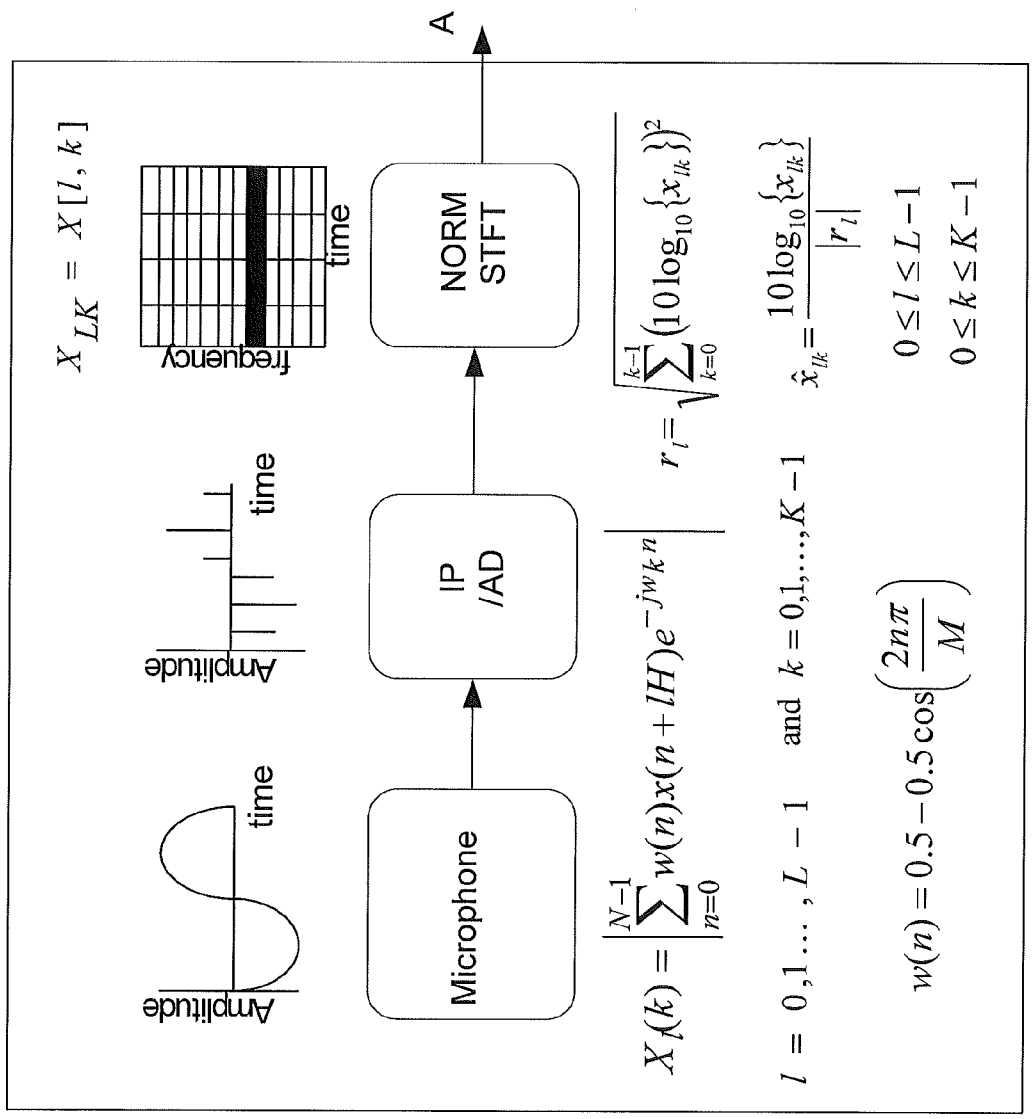
FIGS. 1a and 1b illustrate the system setup to generate the Markov models.

It is noted that each reference in the drawings to "1/4 Oct Frequency Bands" may alternatively be "Subband frequency collection".

DETAILED DESCRIPTION OF PREFERRED EMBODIMENTS

FIGS. 1-8 illustrates the system and various preferred embodiments of the system. Referring to FIGS. 1a and 1b, this shows the main system flow diagram and related equations for generating the Markov models.

Figure 1B:
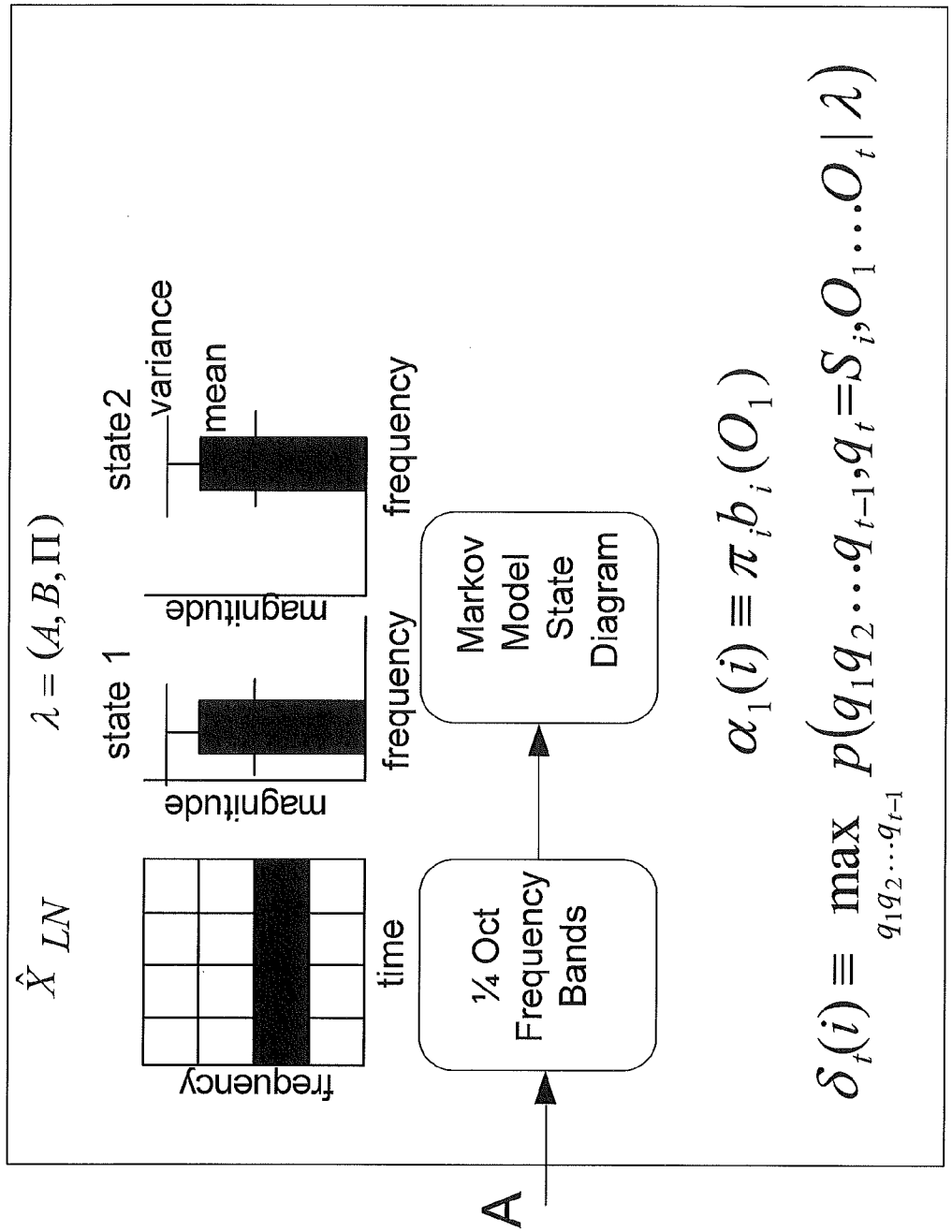

FIG. 1 is split into two sections, FIGS. 1a and 1b, connected at letter A, that describe the two main parts of the system. The parameters of the models are generated by passing many examples of the same type of sound into the system. The two main parts are now defined, as well as their related maths. The left part is interchangeable with the data that can be obtained from a compressed audio format's spectral coefficients. The advantage of this is to improve executable time and improve system scalability.

Figure 2:
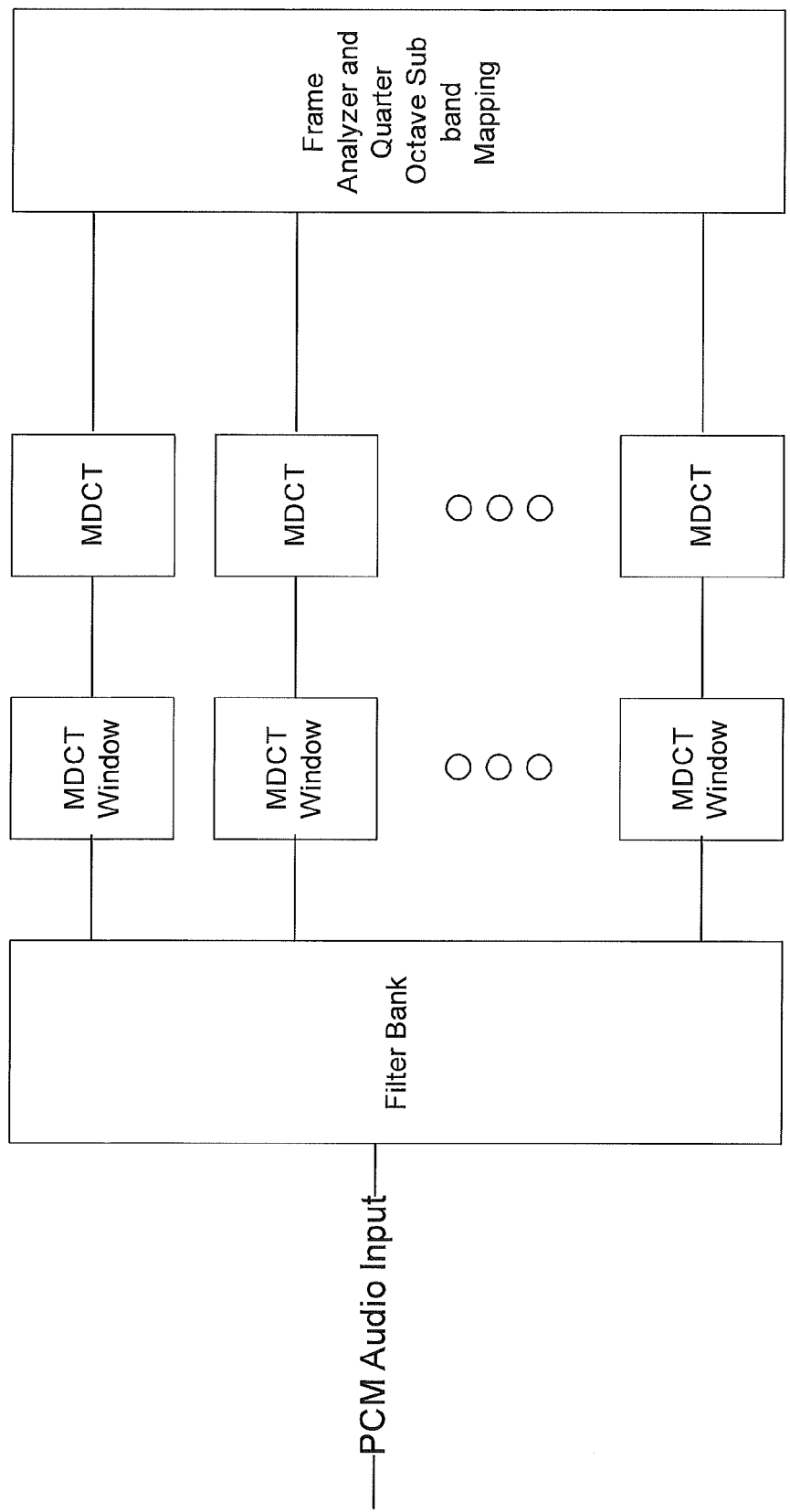
FIG. 2 illustrates how the Markov models can be generated from an example of compressed data.

Referring now to FIG. 2, this shows a system diagram of a typical audio compression system working with a sound identification system. Thus FIG. 2 shows an example of this system working with a generic mpeg audio compression stream or file. The frame analyser is used to obtain the frequency coefficients stored in a frame of compressed audio in this example the frequency components are stored in modified discrete cosine transforms MDCT from a set of pre-filtered PCM audio data. These frequency coefficients can then be mapped onto grouped frequency bands defined in the left part of FIG. 1 whereby the main system takes over the operation.

The complementary, but parallel, system for uncompressed spectral decomposition will now be described. In FIG. 1 are definitions of the various components of the spectral decomposition where w is the window, l is the number of the frame and H is the advance of the window (hop-size) in samples (although there are many window types the Hanning window $$w(n) = 0.5 - 0.5\cos\left(\frac{2n\pi}{M}\right)$$

is used here as a good general purpose window. A time-frequency matrix is then constructed $X_{LK}$, and a normalisation applied to this time-frequency matrix. This take the form of a $L^2$ norm where $r_1$ is the $L^2$ norm gain value, $\hat{x}_{lk}$ is the unit spectral vector, K is the number of spectral coefficients and L is the frame count.

To illustrate further in practical terms the time-frequency matrix for a 44.1 KHz signal might be a 1024 point FFT with a 512 overlap. This is approximately a 20 milliseconds window with 10 millisecond overlap. The resulting 512 frequency bins are then grouped into sub bands, or example quarter-octave ranging between 62.5 to 8000 Hz giving 30 sub-bands, listed below are the lower limits of the frequency bands:

0,62.5,74.32544469,88.38834765,105.1120519,125,
148.6508894,176.7766953,210.2241
038,250,297.3017788,353.5533906,420.4482076,
500,594.6035575,707.1067812,840.896
4153,1000,1189.207115,1414.213562,1681.792831,
2000,2378.41423,2828.427125,3363. 585661,
4000,4756.82846,5656.854249,6727.171322,8000

A lookup table is used to map from the compressed or uncompressed frequency bands to the new sub-band representation bands. For the sample rate and STFT size example given the array might comprise of a (Bin size÷2)×6 array for each sampling-rate/bin number pair supported. The rows correspond to the bin number (centre)–STFT size or number of frequency coefficients. The first two columns determine the lower and upper quarter octave bin index numbers. The following four columns determine the proportion of the bins magnitude that should be placed in the corresponding quarter octave bin starting from the lower quarter octave defined in the first column to the upper quarter octave bin defined in the second column. e.g. if the bin overlaps two quarter octave ranges the 3 and 4 columns will have proportional values that sum to 1 and the 5 and 6 columns will have zeros. If a bin overlaps more than one sub-band more columns will have proportional magnitude values. This example models the critical bands in the human auditory system. This reduced time/frequency representation is then processed by the normalisation method outlined. This process is repeated for all frames incrementally moving the frame position by a hop size of 10 ms. The overlapping window (hop size not equal to window size) improves the time-resolution of the system. This is taken as an adequate representation of the frequencies of the signal which can be used to summarise the perceptual characteristics of the sound. The normalisation stage then takes each frame in the sub-band decomposition and divides by the square root of the average power in each sub-band. The average is calculated as the total power in all frequency bands divided by the number of frequency bands. This normalized time frequency matrix is the passed to the next section of the system where its mean, variances and transitions can be generated to fully characterise the sound's frequency distribution and temporal trends. The next stage of the sound characterisation requires further definitions. A continuous hidden Markov model is used to obtain the mean, variance and transitions needed for the model. A Markov model can be completely characterised by $\lambda=(A, B, \Pi)$ where A is the state transition probability matrix, B is the observation probability matrix and $\Pi$ is the state initialization probability matrix. In more formal terms:

$$A=\lfloor a_{ij} \rfloor \text{ where } a_{ij} \equiv P(q_{t+1}=S_j|q_t=S_i)$$

$$B=\lfloor b_j(m) \rfloor \text{ where } b_j(m) \equiv P(O_t=v_m|q_t=S_j)$$

$$\Pi=[\pi_i] \text{ where } \pi_i \equiv P(q_1=S_i)$$

Where q is the state value, O is the observation value. In FIG. 1 the system needs to generate the state transition probability matrix, a state in our model is actually the frequency distribution characterised by a set of mean and variance data however the format definitions for this will be introduced later. Generating the model parameters is a matter of maximising the probability of an observation sequence. The Baum-Welch algorithm is an expectation maximization procedure that has been used for doing just that. It is an iterative algorithm where each iteration is made up of two parts, the expectation $\epsilon_t(i, j)$ and the maximization $\gamma_t(i)$. In the expectation part, $\epsilon_t(i, j)$ and $\gamma_t(i)$, are computed given $\lambda$, the current model values, and then in the maximization $\lambda$ is step recalculated. These two steps alternate until convergence occurs. It has been shown that during this alternation process, $P(O|\lambda)$ never decreases. Assume indicator variables $z_i^t$ as Expectation $$\varepsilon_t(i,j) = \frac{\alpha_t(i)a_{ij}b_j(O_{t+1})\beta_{t+1}(j)}{\sum_k \sum_l \alpha(k)a_{kl}b_l(O_{t+1})\beta_{t+1}(l)}$$

$$\gamma_t(i) = \sum_{j=1}^N \varepsilon_t(i,j)$$

$$E[z_i^t] = \gamma_t(i) \text{ and } [z_{ij}^t] = \varepsilon_t(i,j)$$

$$z_i^t = \begin{cases} 1 & \text{if } q_t = S_i \\ 0 & \text{otherwise} \end{cases}$$

$$z_{ij}^t = \begin{cases} 1 & \text{if } q_t = S_i \text{ and } q_{t+1} = S_j \\ 0 & \text{otherwise} \end{cases}$$

Maximization $$\hat{a}_{ij} = \frac{\sum_{k=1}^K \sum_{t=1}^{T_k-1} \varepsilon_t^k(i,j)}{\sum_{k=1}^K \sum_{t=1}^{T_k-1} \gamma_t^k(i)}$$

$$\hat{b}_j(m) = \frac{\sum_{k=1}^K \sum_{t=1}^{T_k-1} \gamma_t^k(j)1(O_t^k = v_m)}{\sum_{k=1}^K \sum_{t=1}^{T_k-1} \gamma_t^k(j)}$$

$$\hat{\pi} = \frac{\sum_{k=1}^K \gamma_1^k(i)}{K}$$

Gaussian mixture models can be used to represent the continuous frequency values, and expectation maximization equations can then be derived for the component parameters (with suitable regularization to keep the number of parameters in check) and the mixture proportions. Assume a scalar continuous frequency value, $O_t \in \Re$ with a normal distribution $$p(O_t|q_t=S_j,\lambda) \sim N(\mu_j,\sigma_j^2)$$

This implies that in state $S_j$, the frequency distribution is drawn from a normal distribution with mean $\mu_j$ and variance $\sigma_j^2$. The maximization step equation is then $$\hat{\mu}_j = \frac{\sum_t \gamma_t(j)O_t}{\sum_t \gamma_t(j)}$$

$$\hat{\sigma}_j^2 = \frac{\sum_t \gamma_t(j)(O_{t-1} - \hat{\mu}_j)^2}{\sum_t \gamma_t(j)}$$

The use of Gaussians enables the characterisation of the time-frequency matrix's features. In the case of a single Gaussian per state, they become the states. The transition matrix of the hidden Markov model can be obtained using the Baum-Welch algorithm to characterise how the frequency distribution of the signal change over time.

The Gaussians can be initialized using K-Means with the starting points for the clusters being a random frequency distribution chosen from sample data.

Figure 3A:
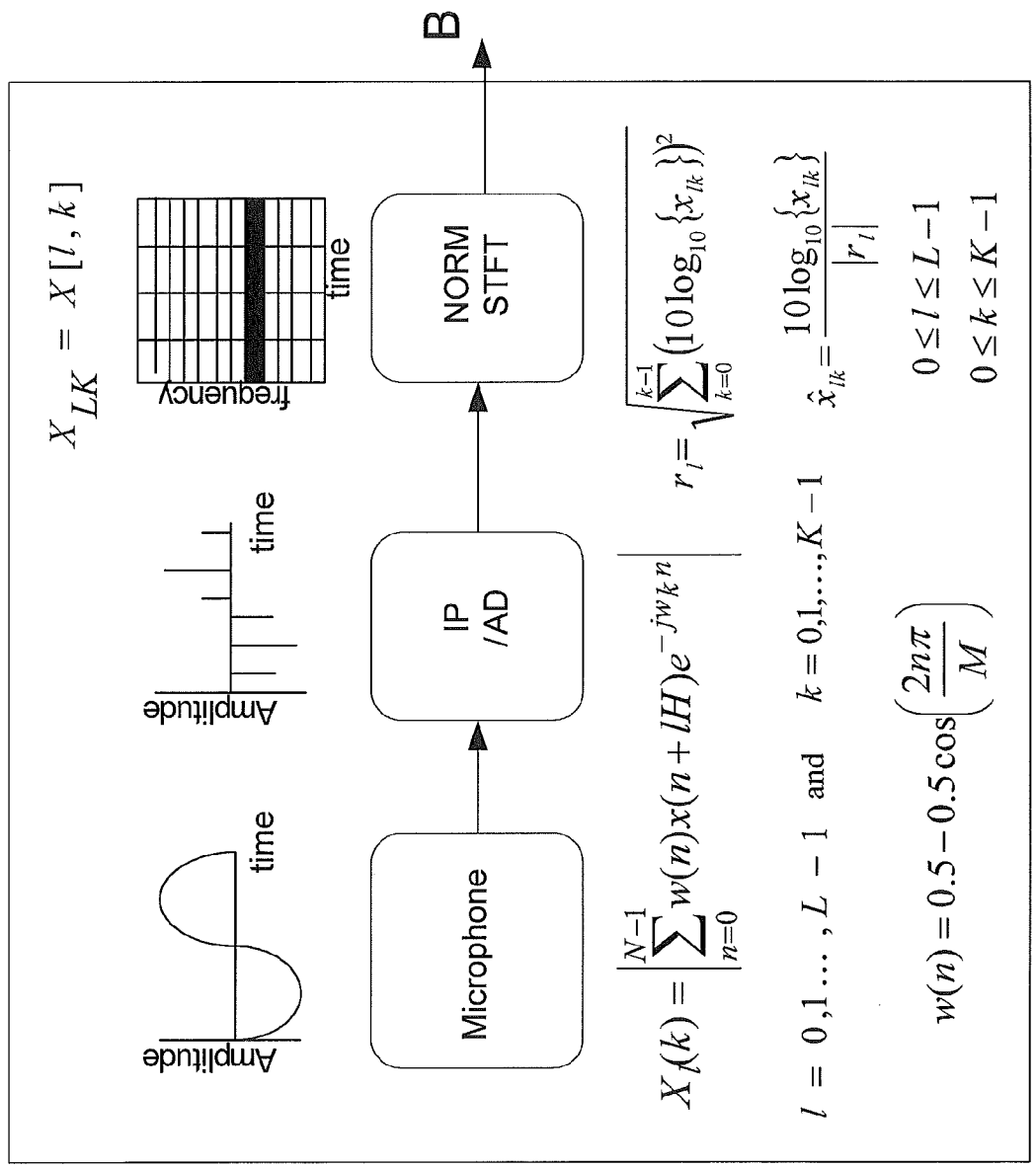
FIGS. 3a and 3b illustrate a system setup to use generated Markov models for sound identification.
Figure 3B:
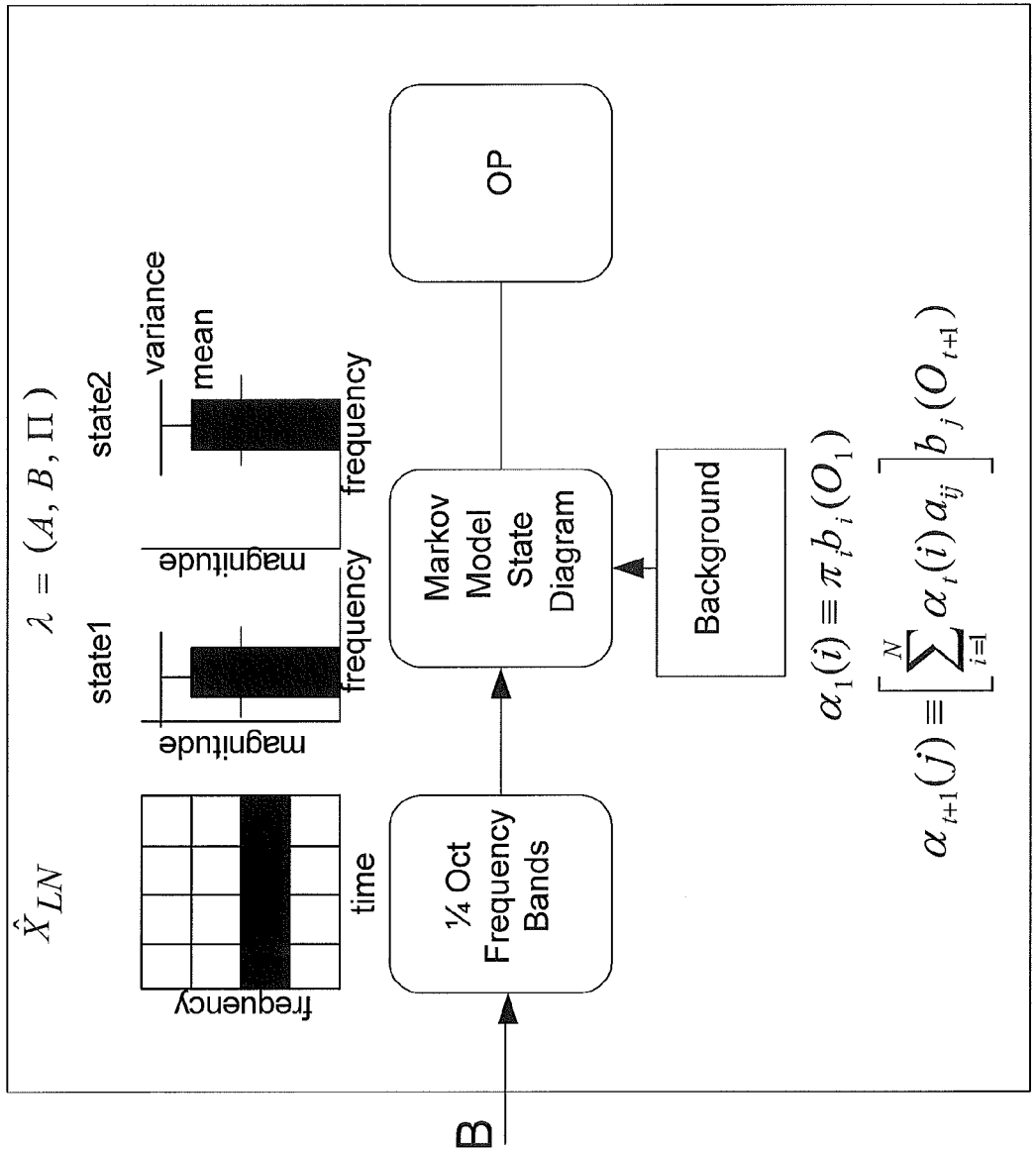

FIG. 3 shows the main system flow diagram and related supporting equations for classification of new sound. FIG. 3 is split into two sections, FIGS. 3a and 3b, connected at letter B. Thus FIG. 3 explains the systems operations for classifying new input and adapting for changes in the acoustic conditions—interference. The first part operates the same as previously explained. After this previously explained part of the system a forward algorithm can be used to determine the most likely state path of an observation sequence and produce a probability in terms of a log likelihood that can be used to classify and incoming signal. The forward and backward procedures can be used to obtain this value from the previously calculated model parameters. In fact only the forward part is needed. The forward variable $\alpha_t(i)$ is defined as the probability of observing the partial sequence $\{O_1 \ldots O_t\}$ until time t and being in $S_i$ at time t, given the model $\lambda$.

$$\alpha_t(i) = P(O_1 \ldots O_t, q_t = S_i | \lambda)$$

This can be calculated by accumulating results and has two steps, initialization and recursion as seen in FIG. 3. $\alpha_t(i)$ explains the first t observations and ends in state $S_i$. This is multiplied by the probability $\alpha_{ij}$ of moving to state $S_j$, and because there are N possible previous states, there is a need to sum over all such possible previous $S_i$. The term $b_j(O_{t+1})$ is then the probability of generating the next observation, frequency distribution, while in state $S_j$ at time t+1. With these variables it is then straightforward to calculate the probability of a frequency distribution sequence.

$$P(O|\lambda) = \sum_{i=1}^{N} \alpha_T(i)$$

Computing $\alpha_t(i)$ has order $O(N^2T)$ and avoids complexity issues of calculating the probability of the sequence. The models will operate in many different acoustic conditions and as it is practically restrictive to present examples that are representative of all the acoustic conditions the system will come in contact with, internal adjustment of the models will be performed to enable the system to operate in all these different acoustic conditions. In FIG. 3 this is shown as the background box. Many different methods can be used for this update. A simplistic illustrative method is listed in FIG. 4, which illustrates adjusting Markov models for different acoustic conditions.

Figure 4:
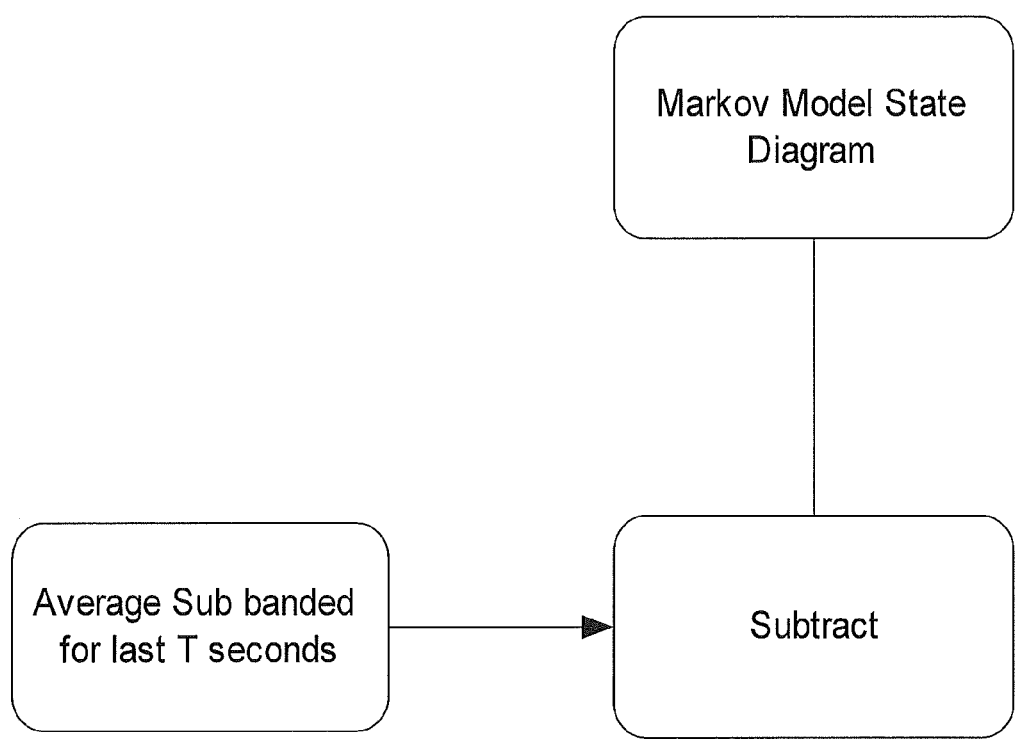
FIG. 4 shows how to update a Markov model being used as part of the sound identification system.

FIG. 4 takes an average value for the sub-bands, in this case the quarter octave frequency values for the last T number of seconds these averages are added to the model values to update the internal model of the sound in that acoustic environment.

Figure 5:
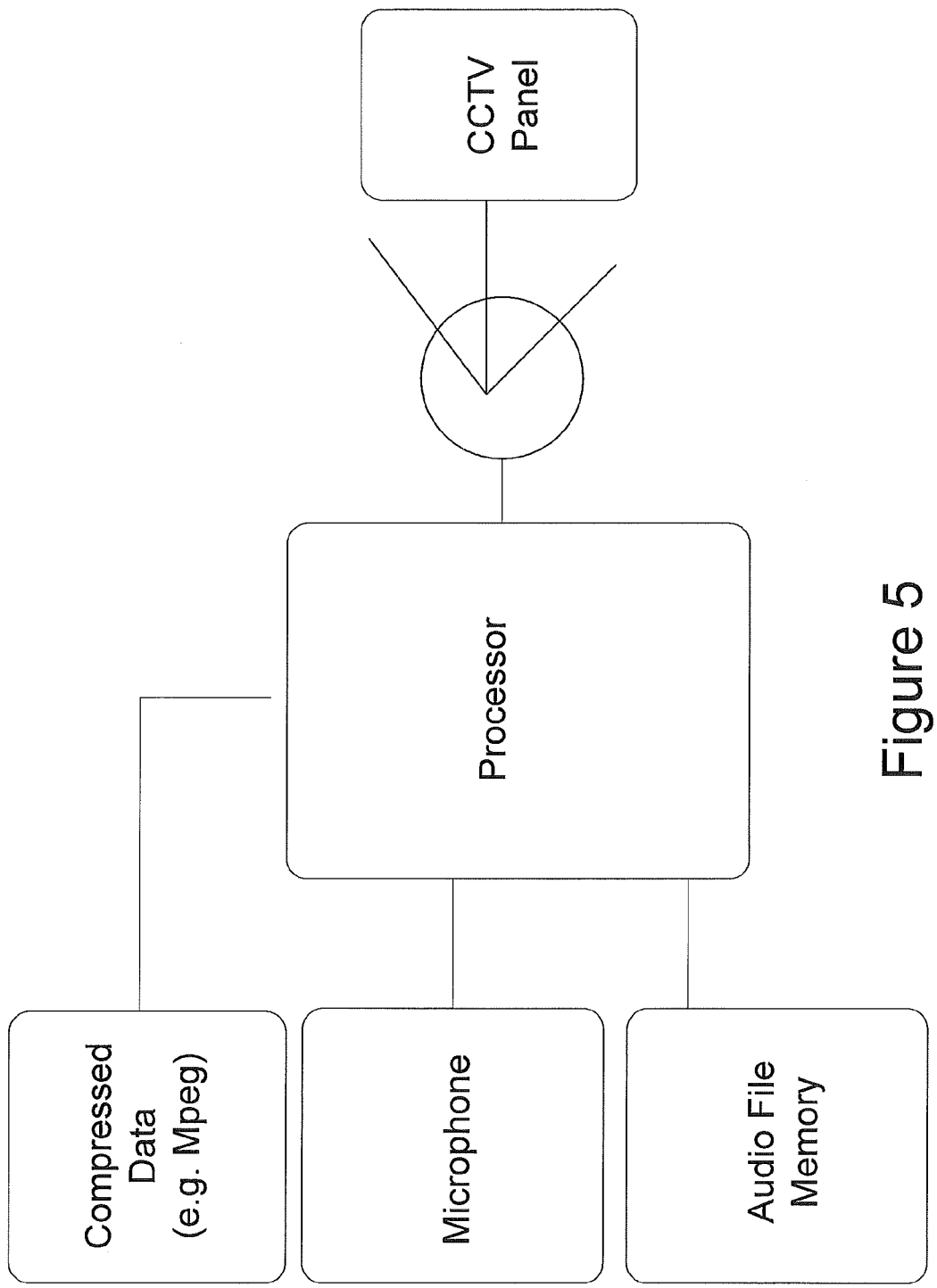
FIG. 5 shows an example of a preferred embodiment of the system in a CCTV system.

FIG. 5 shows a system operation diagram for CCTV camera system, more particularly a typical system set-up for the CCTV system. This may comprise a compressed feed coming from a camera, which contains the coefficients which can be extracted using a frame analyser. This data is sent to a processor with the pre-derived model parameters with the output and a set of threshold values are used for classifying a set of audio inputs. This is then used to switch various cameras information to be displayed or drawn attention to by an alert.

Figure 6A:
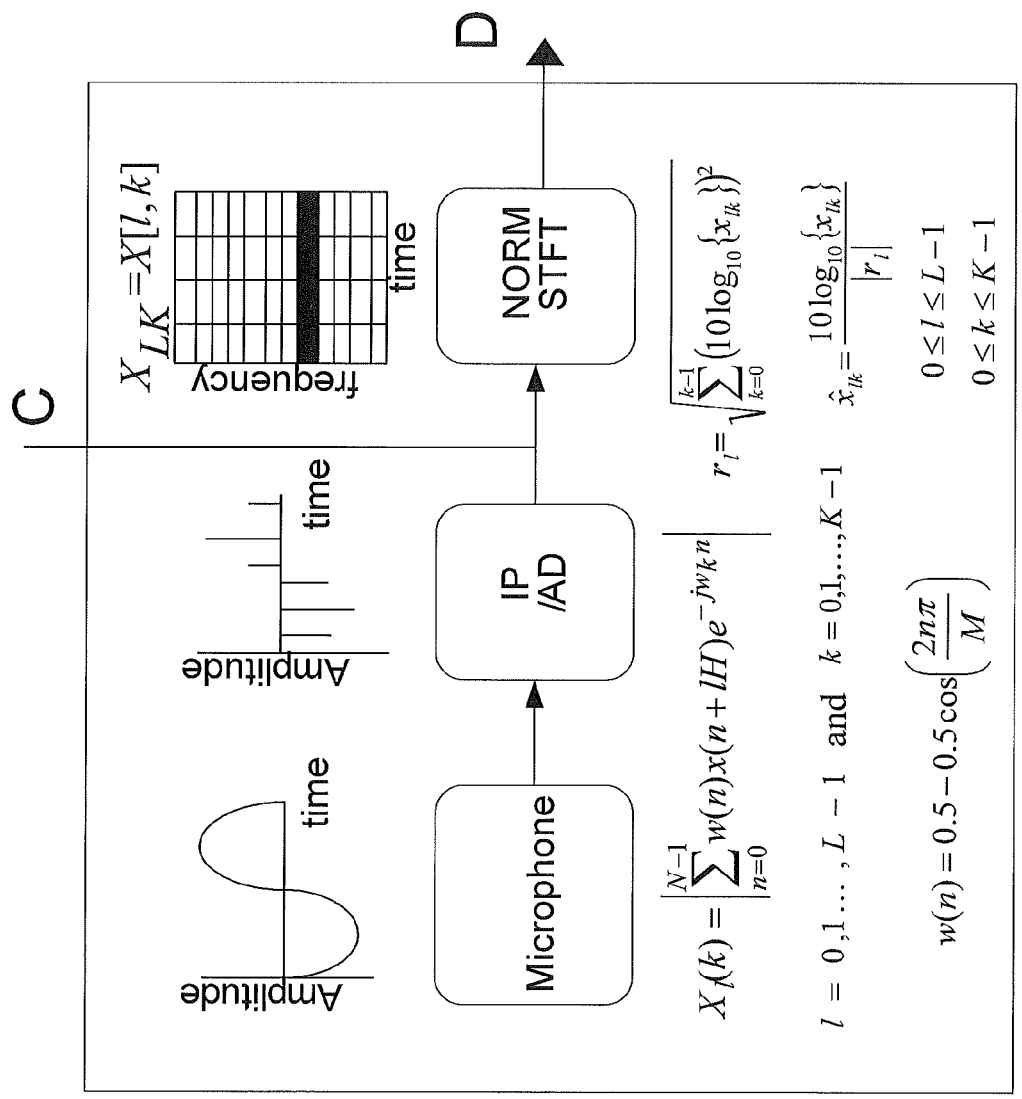
FIGS. 6a and 6b show an example of a preferred embodiment of the system in a baby monitor system.
Figure 6B:
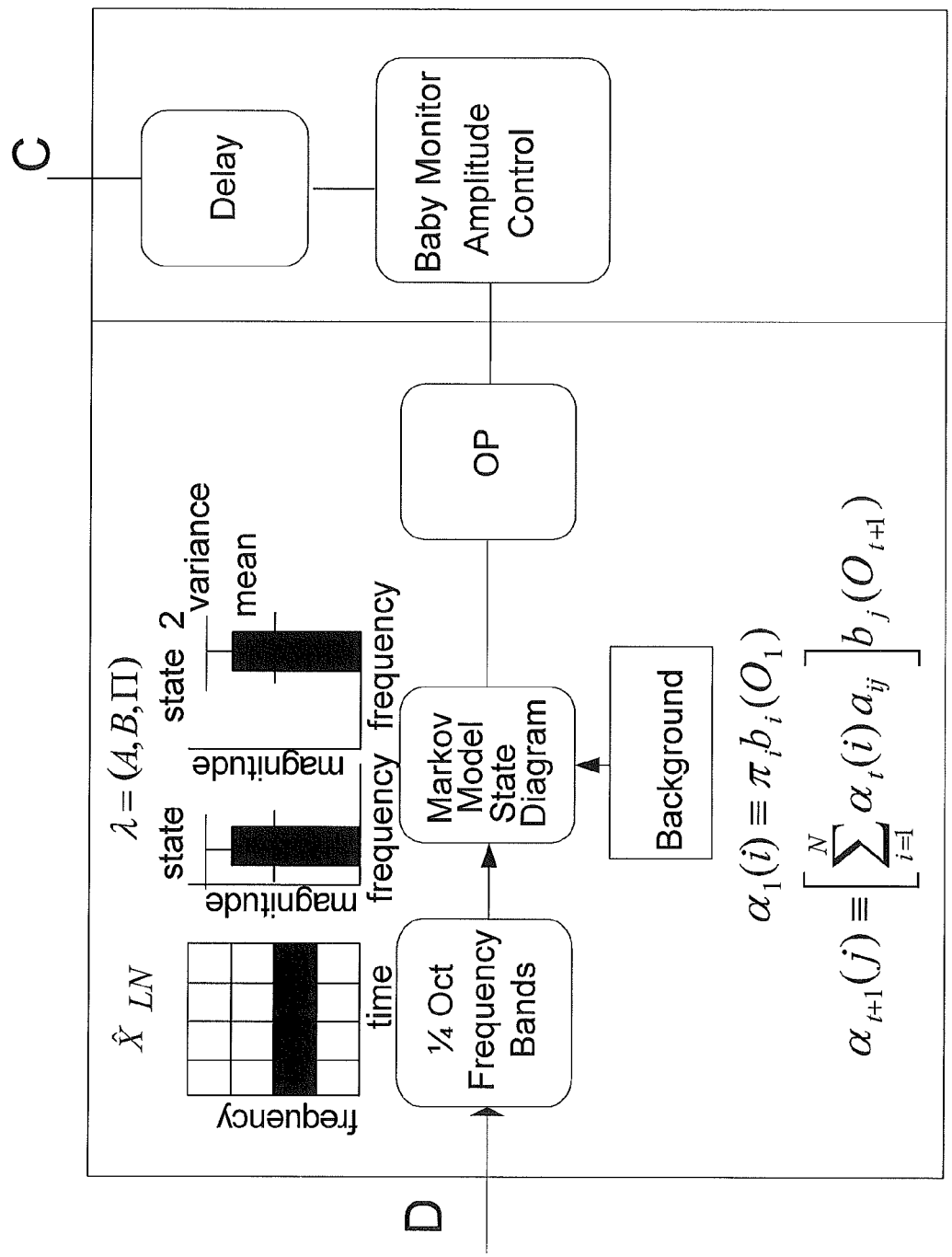

Referring now to FIG. 6, this is split into two sections, FIGS. 6a and 6b, connected at letters C and D. FIG. 6 shows system operation in use with a Baby monitor amplitude control. A system like the one described or similar in its ability to identify sounds can be used as an amplitude control input or light control input for drawing attention to sounds that would otherwise be lost. For example sounds that are quiet and would otherwise be missed, such as breathing difficulties, coeing or chocking can be detected and used to control the playback volume. This would function like a normal baby monitor but have the additional feature of drawing attention to itself when sounds of concern are detected or not detected.

Figure 7A:
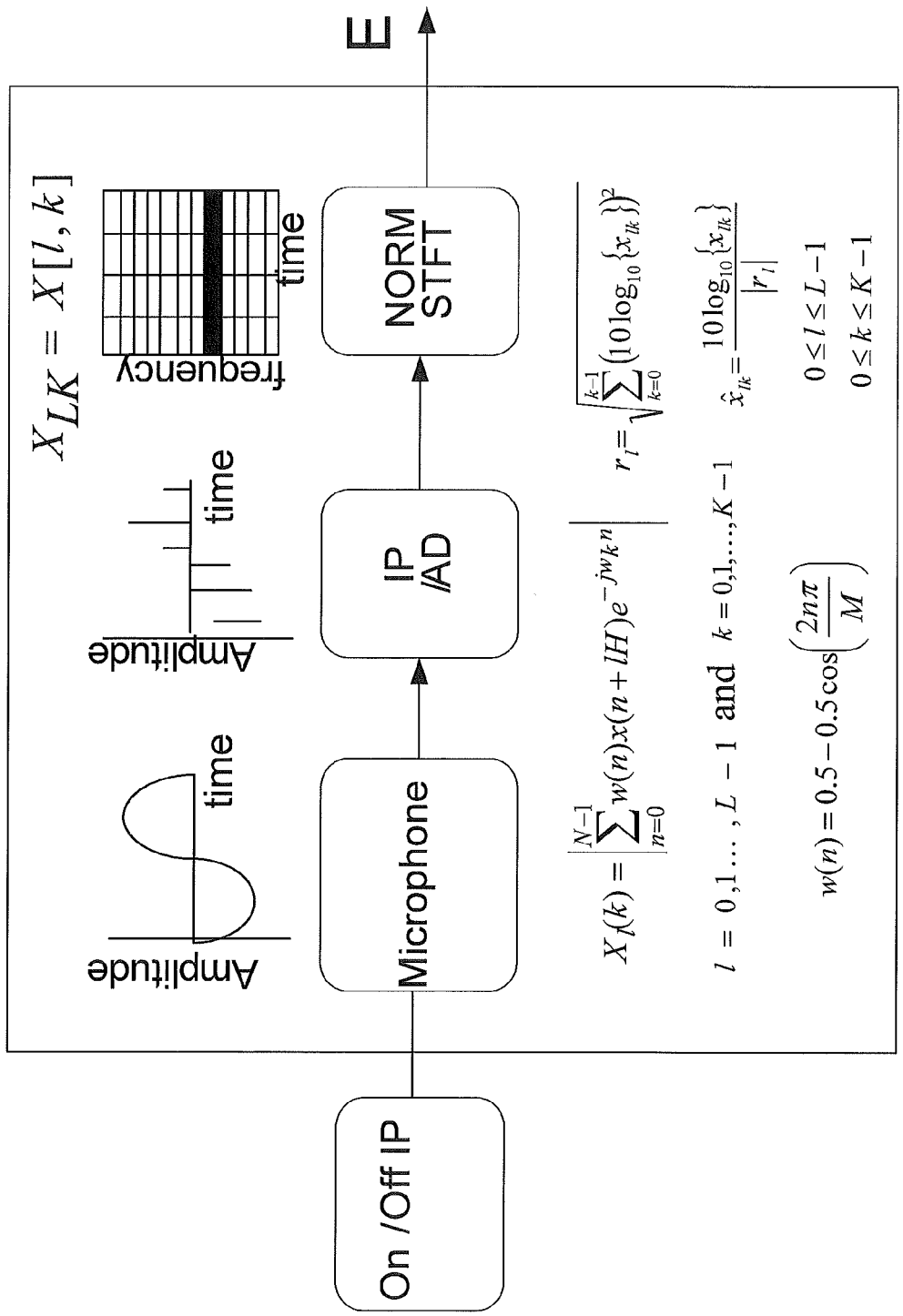
FIGS. 7a and 7b show an example of a preferred embodiment of the system in an in-home assistance system.
Figure 7B:
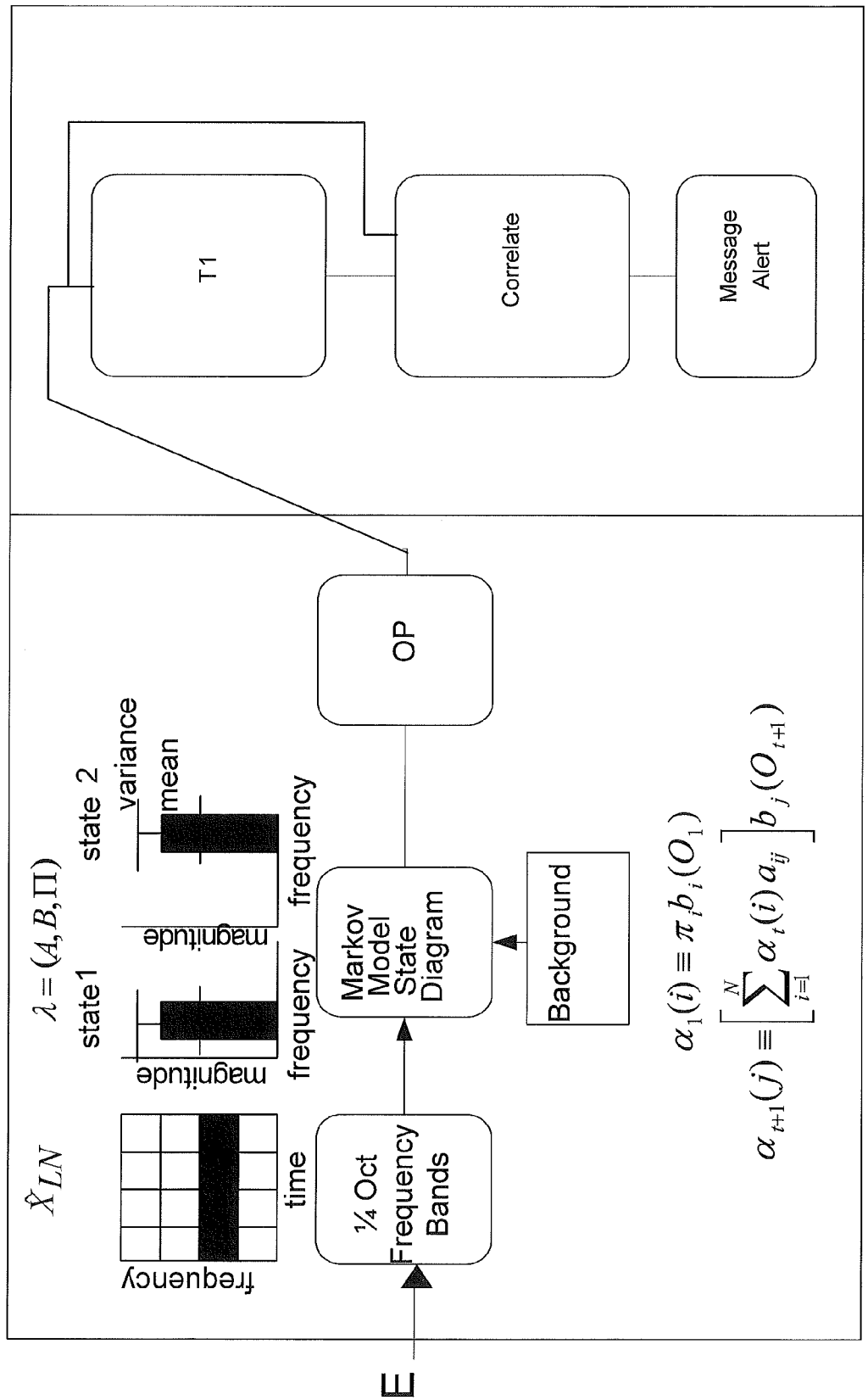

Referring now to FIG. 7, this is split into two sections, FIGS. 7a and 7b, connected at letter E. FIG. 7 shows system operation in use with a home care help system. A sound recognition system like the one described or similar can be used as a home alert use in substitution of a panic button to detect calls for help trigged by specific input, for example 3 hand claps or 3 shoe bangs on the floor. This would operate by a repeated pattern being detected followed by a pause where by the system would confirm it had detected the pattern and ask for confirmation. Once the pattern had been reconfirmed the system would send a alert to a operator or message to another individual.

Figure 8A:
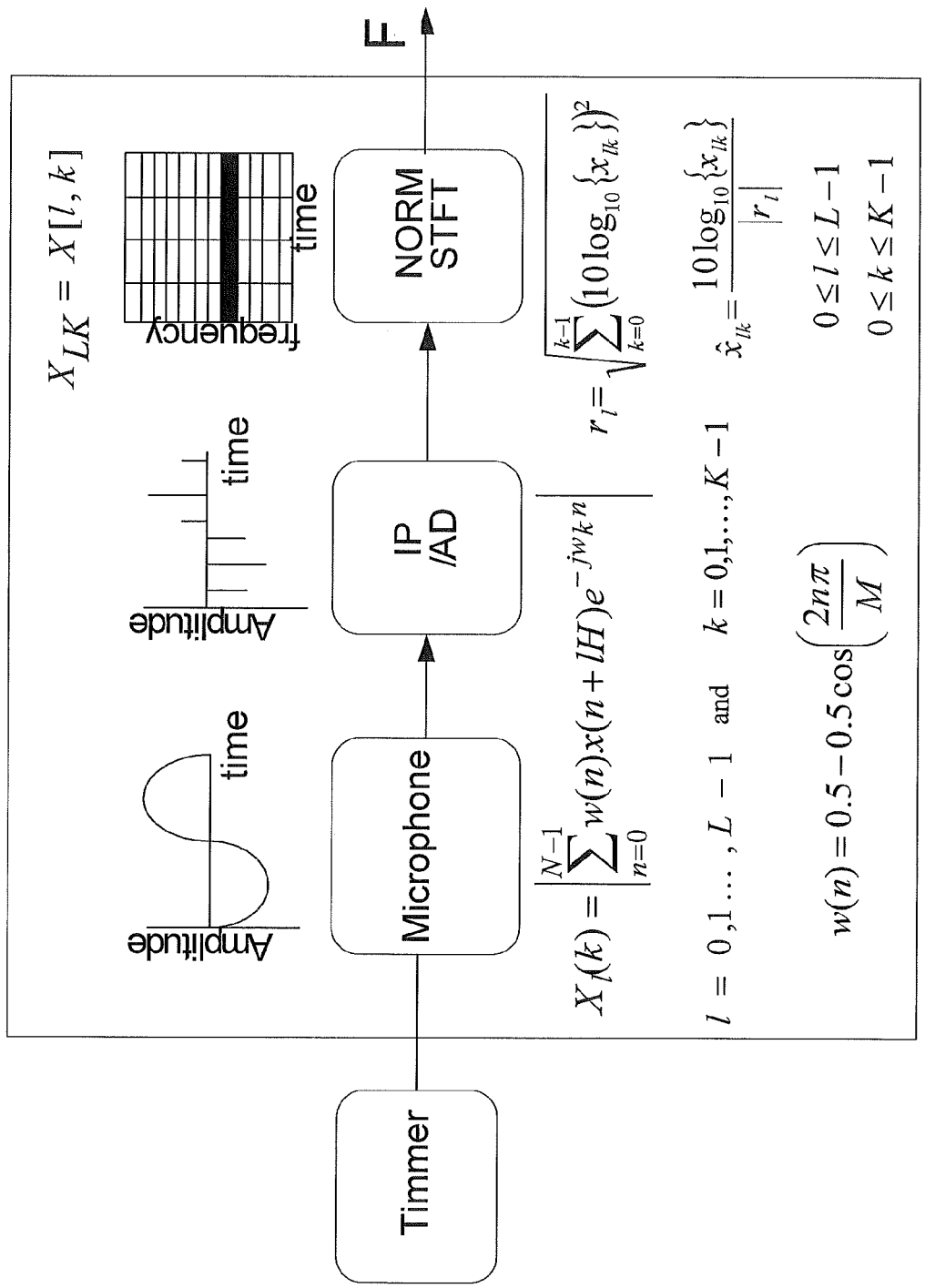
FIGS. 8a and 8b show an example of a preferred embodiment of the system in an office phone PBX system.
Figure 8B:
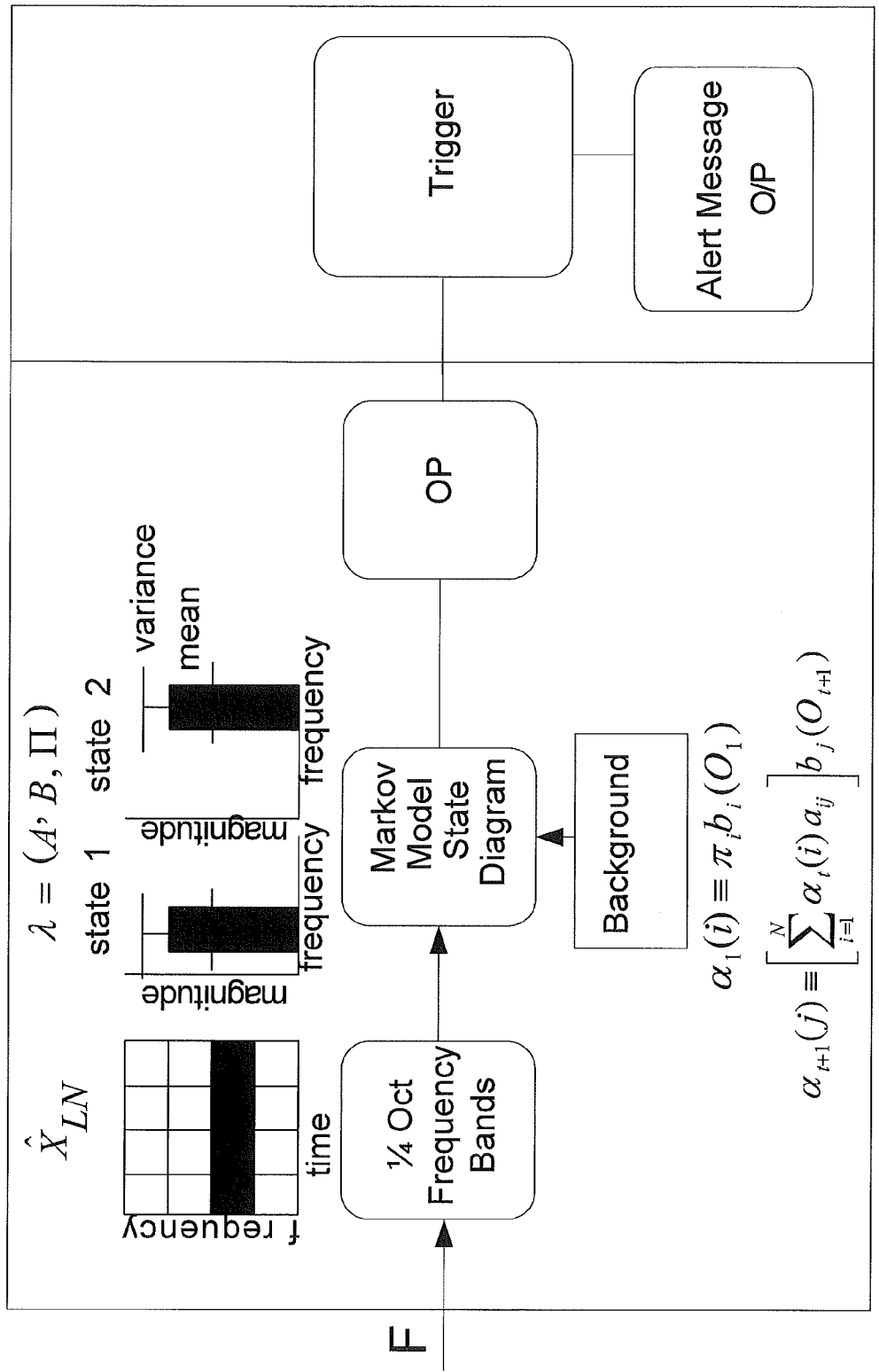

Referring now to Figure, this is split into two sections, FIGS. 8a and 8b, connected at letter F. FIG. 8 shows system operation in the use with an office phone system. A sound recognition system similar to the one described can be used to turn an office or home telephone network into an intruder detection system where a microphone is installed in the base of the phone for means of hand free communication and the microphone can be activated remotely based on a timer. This timer would activate the phones microphone at certain times e.g. night times and then detect sounds synonymous with break-ins, for example windows breaking or general movement. An alert is then triggered and sent to a camera system to point camera at that location, a message to an operator, control system to turn on lights or message to operator or security guard.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A camera system including at least one camera, at least one microphone to capture sound, and a digital sound recognition system to recognise one or more target sounds in said captured sound, wherein said digital sound recognition system comprises:

a sound input coupled to said at least one microphone;
program memory storing processor control code;
working memory;
non-volatile memory for storing one or more statistical models $\lambda$ of one or more target sounds; and
a processor coupled to said sound input, to said working memory, and to said program memory for executing said processor control code, wherein said processor control code comprises code to:
input sound data for a sound, the sound data defining frequency domain data, said frequency domain data defining an energy of said sound in a plurality of frequency ranges;
receive and store in said non-volatile memory pre-derived statistical model parameters representing a set of statistical models λ representing a set of said target sounds, wherein said parameters characterise said set of target sounds;

perform a multiple component decomposition of said sound data by applying a succession of windows to said sound data to construct a time frequency representation of said sound data;

calculate, for said set of statistical models λ representing said set of said target sounds, the probability of an observed frequency distribution sequence in said multiple component decomposition of said sound data up to a time T, given the model λ:

$$P(O | \lambda) = \sum_{i=1}^{N} \alpha_T(i)$$

where $\alpha_t(i)$ represents the probability of observing said time frequency representation of said sound data up to time t, where i indexes a state of said model defined by mean and covariance values, and wherein $P(O|\lambda)$ characterises how a frequency distribution of said statistical model λ changes over time;

apply a set of threshold values to said probability of an observed frequency distribution sequence in said multiple component decomposition to classify said sound data according to said set of statistical models λ;

move a view of said camera in response to classification of said sound data according to said set of statistical models λ to direct said camera towards a recognised target sound.

2. A camera system as claimed in claim 1 wherein said one or more target sounds comprise one or more of breaking glass, alarm, gunshot, aggressive vocalisation, and a sound of movement.

3. A camera system as claimed in claim 1 wherein said one or more statistical models comprise one or more Markov models.

4. A camera system as claimed in claim 1 wherein said sound data comprises compressed sound data.

5. A camera system as claimed in claim 1 further comprising adjusting said one or more statistical models to adapt to an operating environment of the digital sound recognition system.

6. A camera system as claimed in claim 1 wherein said adjusting comprises adjusting one or more of said by a set of mean and covariance values defining said states of said one or more models.

7. A camera system as claimed in claim 1 wherein said processor control code further comprises code to switch a view between a plurality of cameras or provide an alert when said digital sound recognition system recognises said one or more target sounds.

8. A method of controlling a camera system, the camera system including at least one camera, at least one microphone to capture sound, and a digital sound recognition system to recognise one or more target sounds in said captured sound, the method comprising:

inputting sound data for a sound, the sound data defining frequency domain data, said frequency domain data defining an energy of said sound in a plurality of frequency ranges;

receiving and storing in non-volatile memory pre-derived statistical model parameters representing a set of statistical models λ representing a set of said target sounds, wherein said parameters characterise said set of target sounds;

performing a multiple component decomposition of said sound data by applying a succession of windows to said sound data to construct a time frequency representation of said sound data;

calculating, for said set of statistical models λ representing said set of said target sounds, the probability of an observed frequency distribution sequence in said multiple component decomposition of said sound data up to a time T, given the model λ:

$$P(O | \lambda) = \sum_{i=1}^{N} \alpha_T(i)$$

where $\alpha_t(i)$ represents the probability of observing said time frequency representation of said sound data up to time t, where i indexes a state of said model defined by mean and covariance values, and wherein $P(O|\lambda)$ characterises how a frequency distribution of said statistical model λ changes over time;

applying a set of threshold values to said probability of an observed frequency distribution sequence in said multiple component decomposition to classify said sound data according to said set of statistical models λ; and moving a view of said camera in response to classification of said sound data according to said set of statistical models λ to direct said camera towards a recognised target sound.

9. A non-transitory data carrier carrying processor control code for controlling a camera system, the camera system including at least one camera, at least one microphone to capture sound, and a digital sound recognition system to recognise one or more target sounds in said captured sound, wherein the processor control code comprises code to:

input sound data for a sound, the sound data defining frequency domain data, said frequency domain data defining an energy of said sound in a plurality of frequency ranges;

receive and store in non-volatile memory pre-derived statistical model parameters representing a set of statistical models λ representing a set of said target sounds, wherein said parameters characterise said set of target sounds;

perform a multiple component decomposition of said sound data by applying a succession of windows to said sound data to construct a time frequency representation of said sound data;

calculate, for said set of statistical models λ representing said set of said target sounds, the probability of an observed frequency distribution sequence in said multiple component decomposition of said sound data up to a time T, given the model λ:

$$P(O | \lambda) = \sum_{i=1}^{N} \alpha_T(i)$$

where $\alpha_t(i)$ represents the probability of observing said time frequency representation of said sound data up to time t, where i indexes a state of said model defined by mean and covariance values, and wherein $P(O|\lambda)$ characterises how a frequency distribution of said statistical model λ changes over time;

apply a set of threshold values to said probability of an observed frequency distribution sequence in said multiple component decomposition to classify said sound data according to said set of statistical models λ; and move a view of said camera in response to classification of said sound data according to said set of statistical models λ to direct said camera towards a recognised target sound.

10. A camera system as claimed in claim 1, wherein said multiple component decomposition of said sound data is derived from pre-calculated frequency components of an MPEG encoded data signal.

* * * * *